United States Patent

[11] 3,578,157

[72] Inventor Laszlo Hidassy
   Elizabeth, N.J.
[21] Appl. No. 869,303
[22] Filed Oct. 24, 1969
   Division of Ser. No. 705,046, Feb. 13, 1968,
   Pat. No. 3,515,178
[45] Patented May 11, 1971
[73] Assignee Thomas & Betts Corporation
   Elizabeth, N.J.

[54] DISPENSING CARTRIDGE
   7 Claims, 4 Drawing Figs.
[52] U.S. Cl. .................................................. 206/56AC,
   221/312
[51] Int. Cl. .................................................. B65d 83/00
[50] Field of Search ........................................ 42/6, 18,
   50; 89/34; 206/56 (M), 56 (A), 56 (DF); 221/312,
   287, 197, 1; 220/24 (A), 42 (B); 211/49, 53, 54,
   162

[56] References Cited
UNITED STATES PATENTS

| | | | |
|---|---|---|---|
| 518,821 | 4/1894 | Mannlicher .................. | 42/50 |
| 1,331,155 | 2/1920 | Johnson ...................... | 42/50 |
| 1,573,445 | 2/1926 | Phillips........................ | 220/42(B)X |
| 2,112,470 | 3/1938 | Sevelle ........................ | 222/563X |
| 2,409,568 | 10/1946 | Johnson, Jr.................. | 42/18 |
| 2,951,249 | 9/1960 | Saltz............................ | 206/56(DF) |
| 3,228,555 | 1/1966 | Pinto........................... | 221/312X |

FOREIGN PATENTS

| | | | |
|---|---|---|---|
| 450,722 | 7/1936 | Great Britain................ | 42/50 |
| 152,052 | 10/1955 | Sweden ........................ | 220/42(B) |

Primary Examiner—Samuel F. Coleman
Attorney—David Teschner

ABSTRACT: The cartridge of the invention is composed of two arcuate portions joined at their longer arcuate length and open at their shorter arcuate end to allow the articles stored therein to extend beyond the cartridge and to permit a feed mechanism to enter the cartridge and eject the articles therein. Expanded areas permit acceptance of the wider head portion of the articles and removable plugs placed therein provide for article alignment and packing as well as a simple way to permit removal of the articles in the cartridge.

Patented May 11, 1971

INVENTOR.
LASZLO HIDASSY

BY David Fearline

ATTORNEY

Patented May 11, 1971

INVENTOR.
LASZLO HIDASSY

BY

ATTORNEY

DISPENSING CARTRIDGE

CROSS-REFERENCE TO RELATED APPLICATIONS

This is a division of application Ser. No. 705,046 filed Feb. 13, 1968, now U.S. Pat. No. 3,515,178, entitled Automatic Bundling Strap Installing Tool by Laszlo Hidassy and assigned to the assignee of the instant invention.

BACKGROUND OF THE INVENTION N

1. Field of The Invention

The invention is directed to the field of bundling a plurality of discrete articles and more particularly to a cartridge for use with a tool for making such bundles. In order to make bundles of articles having long lengths it is necessary that a number of bundling straps be employed. Most economically this can be done with an automatic tool having a stock of such straps stored therein or in readily interchangeable cartridges. The present invention presents such an interchangeable cartridge.

2. Description of the Prior Art

Cartridges for providing a plurality of discrete articles to a using device are generally heavy and complex. They require feeding mechanisms within them in order that all articles stored within the cartridge be dispensed. One approach employed is to couple all articles to a belt or to interlink the discrete articles which makes loading the cartridge difficult or requires a modification of the article. If the articles are designed for interlinking, the cartridge or tool must provide article separation. If a belt feed is employed, the cartridge must be large enough to accommodate an endless belt or the belt permitted to exit from the cartridge as the article is separated therefrom.

SUMMARY OF THE INVENTION

The present invention overcomes the difficulties noted above with respect to prior art cartridges for presenting a plurality of discrete articles to an automatic tool employing such articles. The cartridge is constructed of two arcuate side panels joined along their arcuate dimension and spaced apart at their smaller arcuate dimension. An arcuate expanded channel is placed in each arcuate side panel adjacent the side panel joint. Within such channel the larger head end portion of the bundling strap is positioned, while the narrower body portion extends radially along the side panels extending therebeyond. The open bottom of the cartridge permits the entry of a feed arm and permits the arm to move each article out of the cartridge in turn. Removable plugs placed at the ends of the expanded channel hold the strap heads in desired position and packed closely together prior to use. One plug is arranged so that it can be separated from the cartridge once it has been positioned in the tool without disturbing the cartridge contents. A second radial expanded channel permits the cartridge to be properly positioned in the cartridge receiver and slots in the cartridge permit the cartridge to be locked to such receiver. It is an object of this invention to provide an improved cartridge for discrete articles.

It is an object of this invention to provide an improved cartridge for discrete articles wherein an external feed mechanism can selectively dispense articles from such cartridge.

It is another object of this invention to provide an improved cartridge wherein articles of nonuniform dimension can be stored and dispensed.

It is still another object of this invention to provide an improved cartridge having removable plug means which can be selectively removed while the cartridge is installed.

Other objects and features of the invention will be pointed out in the following description and claims and illustrated in the accompanying drawings, which disclose, by way of example, the principle of the invention, and the best mode which has been contemplated for carrying it out.

BRIEF DESCRIPTION OF THE DRAWINGS

In the drawings in which similar elements are given similar reference characters.

DESCRIPTION OF THE PREFERRED EMBODIMENT

Figure 1:
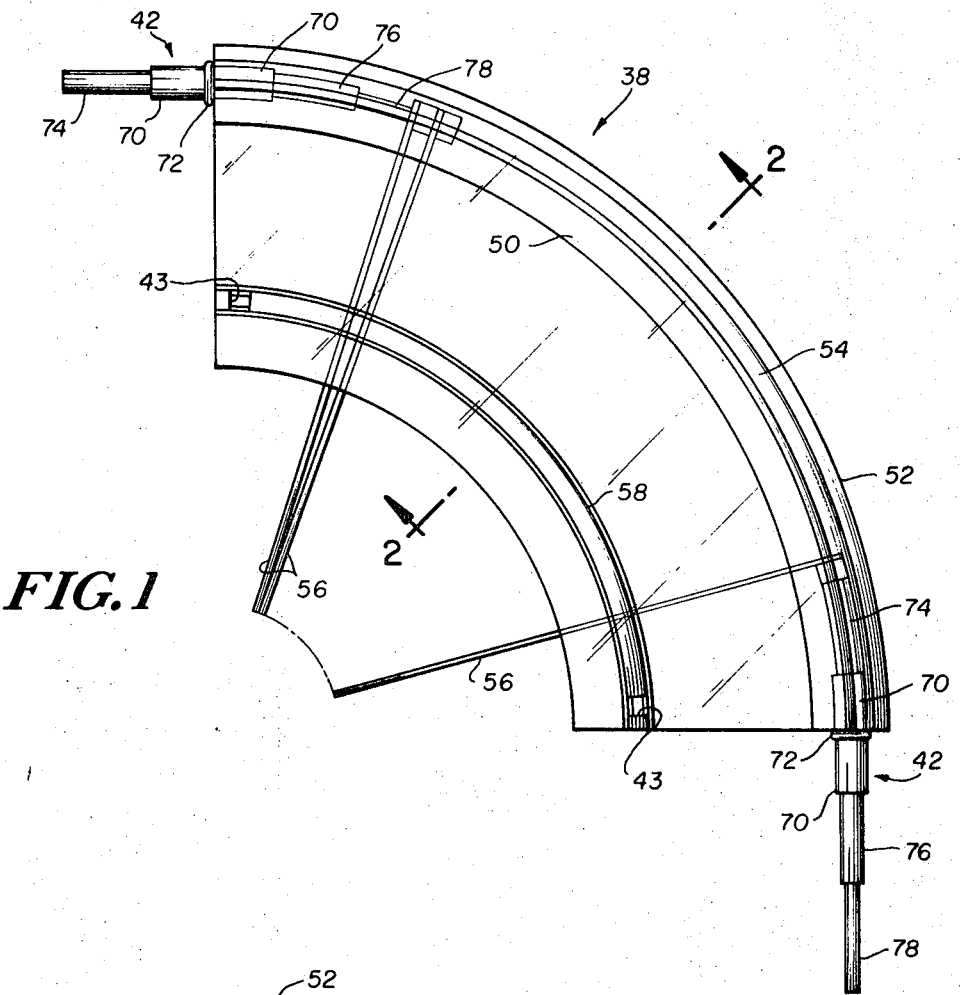
FIG. 1 is a side elevation of a cartridge constructed in accordance with the concepts of the invention.
Figure 2:
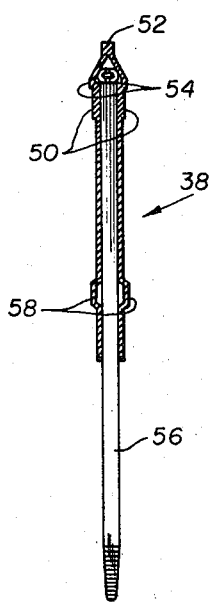
FIG. 2 is a sectional view of the cartridge of FIG. 1 taken along the lines 2–2.

Referring now to FIGS. 1 and 2, the details of a cartridge 38 constructed in accordance with the concepts of the invention is shown. The cartridge 38 is shown to contain a plurality of cable-bundling straps 56. Cable-bundling straps 56 may be of the type shown, described and claimed in U.S. Pat. No. 3,022,557 to M. C. Logan, issued Feb. 27, 1962, for a "Cable Bundling and Supporting Strap," assigned to the assignee of the instant application, or any other convenient type of bundling strap available in the art. The bundling straps 56 generally have a body portion terminating at one end in a tapered tail end portion and a head end portion of greater width than the body portion. Additionally, the head end portion has a greater height than the body portion.

The cartridge 38 is formed of two arcuate wall portions 50 which are identical and which may conveniently be formed of metal or plastic. For the sake of clarity the wall portions 50 are shown to be made of a clear plastic material. The arcuate wall portions 38 are joined along their largest arcuate dimension as at 52 by cementing, etc. The ends of the arcuate wall portions 50 adjacent the shortest arcuate dimension are spaced apart by the width of the straps 56 and the straps 56 are permitted to extend beyond the arcuate wall portions 50 in the direction of the center of curvature of the cartridge 38. The spacing of these ends also permits a feed arm to enter the cartridge and advance straps 56 along and through cartridge 38.

An arcuate groove 54 is provided adjacent the joint 52 to accommodate the enlarged head end portion of straps 56. A rib 58 adjacent the open ends of cartridge 38 facilitates the positioning of cartridge 38 in a cartridge receiver 40 as will be described below with reference to FIG. 3. Slots 43 are provided to accept locking means to hold the cartridge 38 to the cartridge receiver 40.

Figure 4:
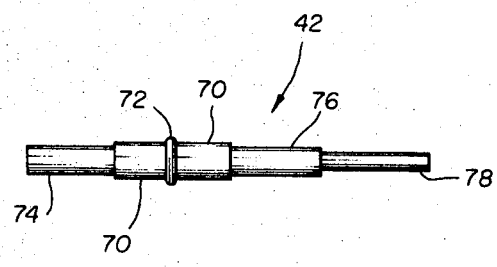
FIG. 4 is a side elevation of one of the removable plugs of FIG. 1.

To hold the straps 56 in the cartridge 38 and to facilitate their removal therefrom there are employed removable plugs 42. As is shown in FIG. 4, the plugs 42 comprise a central cylinder 70 dimensioned for frictional engagement within the groove 54. A stop ring 72 is positioned intermediate the cylinder 70 to limit the insertion of cylinder 70 within groove 54. Additional cylinders 74 and 76 are placed at either end of cylinder 70. Cylinder 74 will form a stop surface for the head of straps 56 within the cartridge 38. A long cylindrical tail 78 extends from cylinder 76. Positioned as is shown in the upper left portion of FIG. 1, the tail 78 extends within groove 54 to keep the head end portions of the straps 56 in close contact, while cylinder 74 of the plug 42 at the lower right-hand portion of the cartridge 38 acts as a stop for the heads of the straps 56. Plug 42 at the lower right-hand portion of cartridge 38 has tail 78 extending beyond the cartridge 38 to facilitate removal of the plug 42 once the cartridge 38 is positioned in receiver 40.

Figure 3:
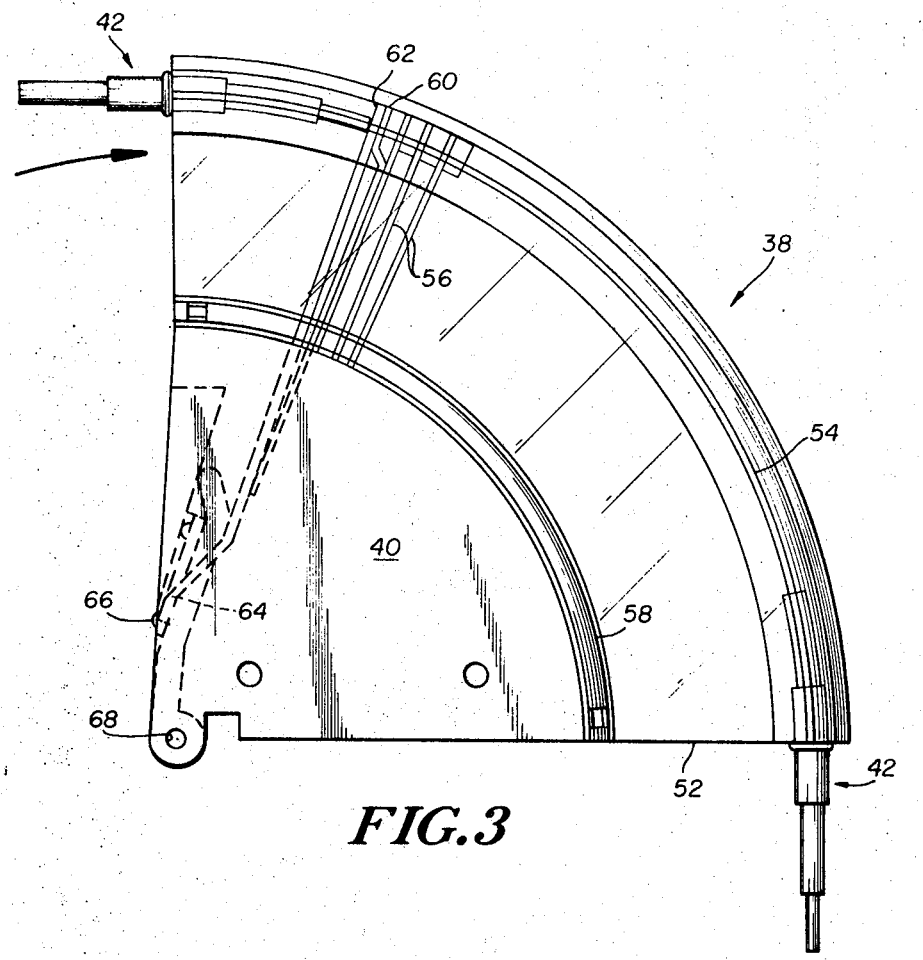
FIG. 3 is a side elevation of the cartridge of FIG. 1 installed in a cartridge receiving means and illustrating the feed means from advancing articles along and out of the cartridge.

In FIG. 3 there is shown the details of the cartridge receiver 40. The individual cable-bundling straps 56 are urged from the cartridge 38 by means of a flat spring 60 mounted upon a connecting arm 62. The connecting arm 62 is in turn connected to a spring-loaded arm 64 by means of the fasteners 66. By means of the action of the spring-loaded arm 64 and the flat spring 60 the individual cable-bundling straps 56 are urged from the cartridge 38 into the tool 20 for installation about a plurality of wires to be bundled. Spring-loaded arm 64 is pivoted about a pivot point 68. Due to the open end construction of cartridge 38 spring 60 and connecting arm 62 can pass freely through the cartridge 38 advancing the straps 56 therealong and therethrough.

The embodiments of the invention in which an exclusive property or privilege is claimed are defined as follows:

I claim:

1. A cartridge for storing a plurality of articles having differing width and thickness dimensions along their respective lengths comprising: two substantially planar arcuate members having generally smooth opposing surfaces, and disposed in parallel relationship, said arcuate members generally uniformly spaced apart a distance sufficient to unrestrictively accept the smallest width dimension of such articles therebetween; means to connect said two arcuate members along their longest arcuate path; said two arcuate members being open along their shortest arcuate path to permit the movement therethrough of an external means to arcuately advance such articles through and out of said cartridge; said two arcuate members having complementarily contoured arcuate deformations extending generally adjacent their longest arcuate path, said arcuate deformations defining an enlarged slot proportioned to slidingly accept the largest width dimension of such articles while restricting their axial rotation therewithin; and removable plug means positioned at the ends of said arcuate deformations to prevent the unwanted removal of such articles.

2. A cartridge, as defined in claim 1, wherein the opening along the shortest arcuate path of said two arcuate members is essentially equal to the spacing therebetween to permit such articles to extend beyond said two arcuate members towards the radial center of said two arcuate members.

3. A cartridge, as defined in claim 1, wherein said removable plug means comprise a first cylindrical portion proportioned to frictionally engage said arcuate indentations and be retained thereby and a stop ring positioned intermediate the ends of said first cylindrical portion to limit the insertion of said plug means into said arcuate deformations.

4. A cartridge, as defined in claim 3, wherein said removable plug means further comprise: second and third cylindrical portions, one of said second and third cylindrical portions coupled to each end of said first cylindrical portion; and a fourth cylindrical portion coupled to said second cylindrical portion, said removable plug means being positioned at one end of said arcuate deformation with said fourth cylindrical portion extending therein to tightly hold articles placed within said arcuate deformations together.

5. A cartridge, as defined in claim 3, wherein said removable plug means further comprise: second and third cylindrical portions, one of said second and third cylindrical portions coupled to each end of said first cylindrical portion; and a fourth cylindrical portion coupled to said second cylindrical portion, said removable plug means being positioned at one end of said arcuate deformation with said fourth cylindrical portion extending beyond said cartridge whereby said plug may be removed when it is desired to remove the articles from said cartridge.

6. A cartridge, as defined in claim 1, further comprising additional arcuate deformations in each of said two arcuate members to permit the positioning and supporting of said cartridge in a cartridge receiving device.

7. A cartridge, as defined in claim 6, further comprising locking slots in said addition arcuate deformations to receive locking means whereby said cartridge may be fixed to a cartridge receiving device.